US006281659B1

United States Patent
Giuseppe

(10) Patent No.: US 6,281,659 B1
(45) Date of Patent: Aug. 28, 2001

(54) INDUCTION MOTOR DRIVE AND A PARAMETER ESTIMATION METHOD THEREOF

(75) Inventor: Guidi Giuseppe, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/518,891

(22) Filed: Mar. 6, 2000

(30) Foreign Application Priority Data

Mar. 19, 1999 (JP) .................................................. 11-074821

(51) Int. Cl.[7] ....................................................... H02P 5/28
(52) U.S. Cl. .......................... 318/799; 318/727; 318/804; 318/807; 318/808; 318/809
(58) Field of Search .................... 318/727, 799, 318/804, 807, 808, 809

(56) References Cited

U.S. PATENT DOCUMENTS

| | | | |
|---|---|---|---|
| 3,824,437 | * 7/1974 | Blaschke ............................... | 318/227 |
| 3,962,614 | * 6/1976 | Rettig ..................................... | 318/227 |
| 4,088,934 | * 5/1978 | D'Atre et al. ......................... | 318/227 |
| 4,418,308 | * 11/1983 | Bose ..................................... | 318/803 |
| 4,785,213 | * 11/1988 | Satake ................................... | 310/166 |
| 4,926,105 | * 5/1990 | Mischenko et al. ................. | 318/800 |
| 5,510,689 | * 4/1996 | Lipo et al. ............................ | 318/809 |
| 5,689,170 | * 11/1997 | Ishikawa ............................... | 318/811 |

FOREIGN PATENT DOCUMENTS

| 397322 | 3/1994 | (DE) . |
|---|---|---|
| 19709296 | 9/1998 | (DE) . |

OTHER PUBLICATIONS

H. Kubota et al.; "Speed Sensorless Field–Oriented Control of Induction Motor with Rotor Resistance Adaptation", *IEEE Transactions on Industry Applications*, vol. 30, No. 5; Sep./Oct. 1994.

Hisao Kubota et al.; "Speed Sensorless Field–Oriented Control of Induction Motor with Rotor Resistance Adaptation", IEEE Transactions on Industry Applications; vol. 30, No. 5, pp. 1219–1222; Sep./Oct.1994.

J. Weidauer et al.; "A new adaptation method for induction machines with field oriented control", *EPE Fiernze*; pp. 2–151–2–155; 1991.

* cited by examiner

Primary Examiner—Robert E. Nappi
Assistant Examiner—Rita Leykin
(74) Attorney, Agent, or Firm—Greer, Burns & Crain, Ltd.

(57) ABSTRACT

In an induction motor drive system with/without a speed sensor, resistance values are stably and accurately estimated during the operation of the motor regardless of the operating conditions such as a speed, a load, etc. and of a particular combination of parameters. A suitable point Pr is taken inside a current locus on a stator current vector plane, and a measured current $i_s$ and an observed current $i_s'$ are referenced from this point Pr. The difference between the magnitudes of two vectors $i_s$ and $i_s'$ is associated with an error of a rotor resistance Rr, while the difference between phase shifts is associated with an error of a stator resistance Rs.

20 Claims, 15 Drawing Sheets

INDUCTION MOTOR DRIVE AND A PARAMETER ESTIMATION METHOD THEREOF

BACKGROUND OF THE INVENTION

1. Field of the Invention

The present invention relates to an induction motor drive, and more particularly, to a vector control of an induction motor.

2. Description of the Related Art

A typical direct field-oriented based induction motor drive system is shown in FIG. 12.

The vector control of an induction motor is performed by adjusting the torque and magnetic flux of an induction motor 102 fed by an inverter 101.

FIG. 12 exemplifies an induction motor drive comprising a speed sensor 132. With the vector control of this system, a speed regulator 105 generates a torque current reference 114 based on a PI (Proportional action and Integral action) control from a speed reference 103 being an instruction to the speed of the motor and a rotation speed 112 of the induction motor 102, which is detected by the speed sensor 132 as feedback, and outputs the generated torque current reference 114 to a current regulator 104. The current regulator 104 generates and outputs currents, which are adjusted based on the PI control, from the torque current reference 114 being an instruction to the torque and a flux current reference 113 being an instruction to the flux. Then, a vector rotator 106 transforms these current values into a relative value in a coordinate system (d–q coordinate system) which rotates synchronously with the synthetic vector of the currents, and applies the transformed value to an inverter 101 as a primary voltage command 120. Note that the flux current reference 113 applied to the current regulator 104 can be set constant in a wide range of operation.

Sensors 130 and 131 respectively detect the voltage value and the current value, which are applied from the inverter 101 to the inductor motor 102, as a detected voltage 121 and a detected current 122. After the voltage and the current are transformed into two-phase coordinate system values by 3-2 phase transformers 108 and 109, they are input to a current and flux observer 110 as space vector values Vs 123 and $i_s$ 124.

A stator,rotor resistance (Rs,Rr) estimator 500 estimates a stator resistance Rs and a rotor resistance Rr of the induction motor 102 from the stator current 124 output from the 3-2 phase transformer 109 and an observed current 127 and observed flux 128 output from the current and flux observer 110, and outputs observed values Rs' 503 and Rr' 504 of the resistances Rs and Rr. Then, these values are used by the current and flux observer 110.

The current and flux observer 110 outputs the observed current 127 and the observed flux rotor 128 from the stator voltage Vs 123, the stator current $i_s$ 124, the detected speed 112 of the motor output from the sensor 132, and the estimated stator and rotor resistance values Rs' 503 and Rr' 504 output from the Rs,Rr estimator 500.

The vector rotator 106 vector-rotates the flux command 118 and the torque command 119 in a direction of the flux of the rotor based on the observed rotor flux 128, and outputs the vector-rotated instructions to the inverter 101 as a primary voltage command 120.

Additionally, the vector $i_s$ 124 is vector-rotated by a vector rotator 107 in the direction of the rotor flux based on the observed flux 128 from the current and flux observer 110 in order to obtain the torque current 126 and the flux current 125, which are used as feedback signals by the current regulator 104.

A system without speed sensor, that is a speed-sensorless system, is explained next. In the system comprising no speed sensor, only a stator voltage 121 and a stator current 122 are detected by sensors 130 and 131. The configuration of this system is shown in FIG. 13.

Comparing the configuration shown in FIG. 13 with that shown in FIG. 12, a speed observer 111 which estimates the speed of the motor is added, and an Rs,Rr estimator 501 which estimates resistance values Rs and Rr of the stator and the rotor from a stator current 124, an observed current 127, observed flux 128, and a torque command 119 as a replacement of an Rs, Rr resistance estimator 500.

The speed observer 111 estimates the rotor speed from the stator current $i_s$ 124, the observed current 127 and the observed flux 128 output from a current and flux observer 110, and outputs an observed speed 115 both to a speed regulator 105 and to the current and flux observer 110.

Furthermore, to allow the resistance of the rotor to be observed even in a steady state, a harmonic component 162 is injected in the flux current reference 118.

In the direct field-oriented control, the flux is typically evaluated using an observer as the one described in:

Ref. 1—H. Kubota et al. "Speed Sensorless Field-Oriented Control of Induction Motor with rotor Resistance Adaptation," IEEE Trans. on Ind. Appl., Vol. 30, No. 5, September/October 1994

A conventional mathematical model of the induction motor using a state space notation is as follows:

$$\frac{d}{dt}\begin{bmatrix} i_s \\ \phi_r \end{bmatrix} = A \cdot \begin{bmatrix} i_s \\ \phi_r \end{bmatrix} + B \cdot v_s \quad (1)$$

where $i_s = [\, i_{s\alpha} \quad i_{s\beta} \,]^T$ : STATOR CURRENT;

$\phi_r = [\, \phi_{r\alpha} \quad \phi_{r\beta} \,]^T$ : ROTOR FLUX;

$v_s = [\, v_{s\alpha} \quad v_{s\beta} \,]^T$ : STATOR VOLTAGE;

$$A = \begin{bmatrix} A_{11} & A_{12} \\ A_{21} & A_{22} \end{bmatrix}$$

$$= \begin{bmatrix} -\left(\dfrac{R_s}{\sigma \cdot L_s} + \dfrac{1-\sigma}{\sigma \cdot \tau_r}\right) \cdot I & \dfrac{L_m}{\sigma \cdot L_s \cdot L_r}\left(\dfrac{1}{\tau_r}I - \omega_r J\right) \\ \dfrac{L_m}{\tau_r} I & -\dfrac{1}{\tau_r} I + \omega_r J \end{bmatrix}$$

$$B = \begin{bmatrix} \dfrac{1}{\sigma \cdot L_s} & 0 & 0 & 0 \\ 0 & \dfrac{1}{\sigma \cdot L_s} & 0 & 0 \end{bmatrix}^T ;$$

$$I = \begin{bmatrix} 1 & 0 \\ 0 & 1 \end{bmatrix}; \quad J = \begin{bmatrix} 0 & -1 \\ 1 & 0 \end{bmatrix};$$

$R_s, R_r$ : STATOR AND ROTOR RESISTANCE;

$L_s, L_r, L_m$ : STATOR, ROTOR, AND MUTUAL INDUCTANCE;

$\tau_r = L_r / R_r$ : ROTOR TIME CONSTANT;

$\sigma = 1 - L_m^2 / (L_s L_r)$ : TOTAL LEAKAGE COEFFICIENT;

$\omega_r$ : ANGULAR ROTOR SPEED.

The state equation of a simpler observer is represented by the above provided mathematical model (1). This mathematical model is stable, and the following equation for the current and flux observer 110 is derived from this equation.

$$\frac{d}{dt}\begin{bmatrix} i'_s \\ \phi'_r \end{bmatrix} = A' \cdot \begin{bmatrix} i'_s \\ \phi'_r \end{bmatrix} + B \cdot v_s \qquad (2)$$

where ' indicates an observed value. For example, a matrix A' has the same value as that in the matrix A in the equation (1), but it is evaluated using nominal and estimated parameter values instead of actual values.

The observation and observed values in this specification respectively represent observation and observation values in a modern control theory, and indicates the estimation of state variable values from an output, and the estimated values.

Since the values of the resistances Rs and Rr of the stator and the rotor change with the operating temperature of the motor, their values are normally evaluated during normal motor operations, and the observed values are obtained from the evaluation expression.

This evaluation expression is represented as follows according to the above provided Ref. 1.

$$\frac{dR'_s}{dt} = -k_1 (i_s - i'_s) \cdot i'_s \qquad (3)$$

$$\frac{dR'_r}{dt} = k_2 (i_s - i'_s) \cdot (\phi'_r - L_m i'_s) \qquad (4)$$

where · indicates a dot product of vectors, and k1 and k2 are positive constants.

FIG. 14 is a block diagram showing the details of the Rs,Rr estimator 500 of FIG. 12 based on the above described equations (3) and (4).

In the Rs,Rr estimator 500, an observed current $i_s'$ 127 output from the current and flux observer 110 is first subtracted from the measured current $i_s$ 124 of the stator sensed by the current sensor 131 by a calculator 512 within a stator resistance estimator 502. Next, the dot product of a vector $e_{is}$ and the observed current $i_s'$ 127 is obtained by a dot product processor 507, and the obtained dot product by which a constant −k1 is multiplied by a calculator 513 is integrated by an integrator 509. As a result, the integrated value is output as an observed stator resistance Rs'.

In the meantime, the mutual inductance Lm of the induction motor is multiplied by the observed current is' 127 by a calculator 514, and the dot product of the result of the multiplication and the output vector $e_{is}$ of the calculator 512 is obtained by a dot product processor 508. And a constant k2 is multiplied by the resultant dot product by a calculator 516, and the result of the multiplication is integrated by an integrator 510, so that an observed rotor resistance Rr' 504 is obtained and output.

For a system comprising no speed sensor like the one shown in FIG. 13, a motor rotation speed ωr is not measured. Accordingly, its evaluation value ωr' 115 is used to evaluate the matrix A' in the equation (2).

The evaluation expression in the speed observer 111 is described as follows.

$$\omega'_r = (k_{P\omega} + s \cdot k_{I\omega}) \cdot ((i_{s\alpha} - i'_{s\alpha}) \cdot \phi'_{r\beta} - (i_{s\beta} - i'_{s\beta}) \cdot \phi'_{r\alpha}) \qquad (5)$$

where s is a Laplace operator, and $k_{P\omega}$ and $k_{I\omega}$ are proper gains. The estimated value Rs' of the stator resistance in the system shown in FIG. 13 is given by the equation (3) in a similar manner as in the system which is shown in FIG. 12 and comprises a speed sensor. In the meantime, the estimated value Rr' of the rotor resistance is given by using an algorithm different from that for the system comprising a speed sensor.

To estimate the resistance Rr on the secondary side, a suitable harmonic signal 162 having a frequency f* is injected in the flux current reference 113 as an injection term. As a result, the equation (4) for the resistance Rr is modified as follows if the system does not comprise a speed sensor.

$$\frac{dR'_r}{dt} = -k_3 \cdot (i_d \cdot i'_d) \cdot i_{d,ref} \qquad (6)$$

where $i_d$, $i_d'$, and $i_{d,ref}$ are respectively the measured value, the observed value, and the reference value of the flux current. Additionally, k3 is a positive constant.

FIG. 15 is a block diagram showing the details of the Rs,Rr estimator 501 of FIG. 13 based on the above provided equations (3) and (6).

The measured current $i_s$ 124 of the stator sensed by the current 131 and the observed current $i_s'$ 127 from the current and flux observer 110 are respectively vector-rotated by vector rotators 107 and 142 in the direction of the observed flux 128.

After an observed flux current id' 151 is subtracted from the flux current id 125 by the calculator 157, the dot product between the result of the subtraction and the reference value of the flux current is calculated by a dot product processor 517. Then, a constant k3 is multiplied by a calculator 518, and the result of the multiplication is integrated by an integrator 511, so that an observed rotor resistance Rr' 505 is calculated and output.

In the meantime, the observed stator resistance Rs' 503 is calculated from the measured current $i_s$ 124 of the stator and the observed current $i_s'$ 127 from the current and flux observer 110, and output by the same stator resistance estimator 502 as that shown in FIG. 4.

To precisely control the flux and the torque of the induction motor, the flux direction φr' of the rotor must be accurately observed. However, in the equation (2) for the accurate observation, especially in the matrix A', parameters having the values changing during the operation of the motor, such as the resistance values Rr and Rs on the primary and the secondary sides, which change with a temperature, are included.

The accuracy of the observed values in the flux direction, that is, the quality of the control of the flux and the torque depends on to what extent these parameter values can be known, especially, if the operating speed is low.

Additionally, the estimation of the resistance values during the operation of the motor, which is given by the equations (3) and (4) for the system comprising a speed sensor, or by the equations (3) and (6) for the system comprising no speed sensor, cannot correctly be made in all cases, and is unstable under a particular operating condition and for a particular combination of parameter characteristics of the motor.

SUMMARY OF THE INVENTION

The present invention was developed in consideration of the above described problems, and aims at providing a system and a parameter estimation method which can perform stable and precise control regardless of operating conditions such as a speed, a load of an induction motor, etc. or a particular combination of parameters.

A control system in a first aspect of the present invention, which vector-controls an induction motor, is used mainly in the case where a speed sensor is used, and comprises a first reference point setting unit, a first vector transforming unit, a magnitude calculating unit, a phase difference calculating unit, a first rotor resistance estimating unit, and a stator resistance estimating unit.

The first reference point setting unit sets a point $P_R$ at an arbitrary point on a stator current vector plane.

The first vector transforming unit transforms the measured value and the observed value of the stator current of the induction motor into vectors starting from the above described point $P_R$ on the stator current vector plane.

The magnitude calculating unit obtains the difference between the magnitudes of the vectors transformed by the first vector transforming unit for the above described measured and observed values.

The phase difference calculating unit obtains the difference between the phases of the vectors transformed by the first vector transforming unit for the above described measured and observed values.

The first rotor resistance estimating unit estimates the rotor resistance of the induction motor from the above described magnitude difference.

The stator resistance estimating unit estimates the stator resistance of the induction motor from the above described phase difference.

A control system in a second aspect of the present invention is applied mainly to the case where no speed sensor is used. This system comprises a harmonic signal injecting unit, a second reference point setting unit, a second vector transforming unit, a magnitude calculating unit, and a second rotor resistance estimating unit.

The harmonic signal injecting unit injects a harmonic signal in a flux current.

The second reference point setting unit sets a point $P_{Rr}$ at an arbitrary position on a stator current vector plane.

The second vector transforming unit transforms the harmonic components, corresponding to the harmonic signal, of the measured and the observed values of the stator current of the induction motor into vectors starting from the point $P_R$ on the stator current vector plane.

The magnitude calculating unit obtains the difference between the magnitudes of the vectors transformed by the second vector transforming unit for the harmonic component of the measured and the observed values.

The second rotor resistance estimating unit estimates the rotor resistance of the induction motor from the above described magnitude difference.

According to the present invention, only a stator current value is measured, so that each state of an induction motor can be evaluated from the current value.

Additionally, also stator and rotor resistances can be arbitrarily estimated even during the operation of the motor, since the estimation is made based on the difference between the measured and the observed values of the stator current.

DESCRIPTION OF THE PREFERRED EMBODIMENTS

Figure 1:
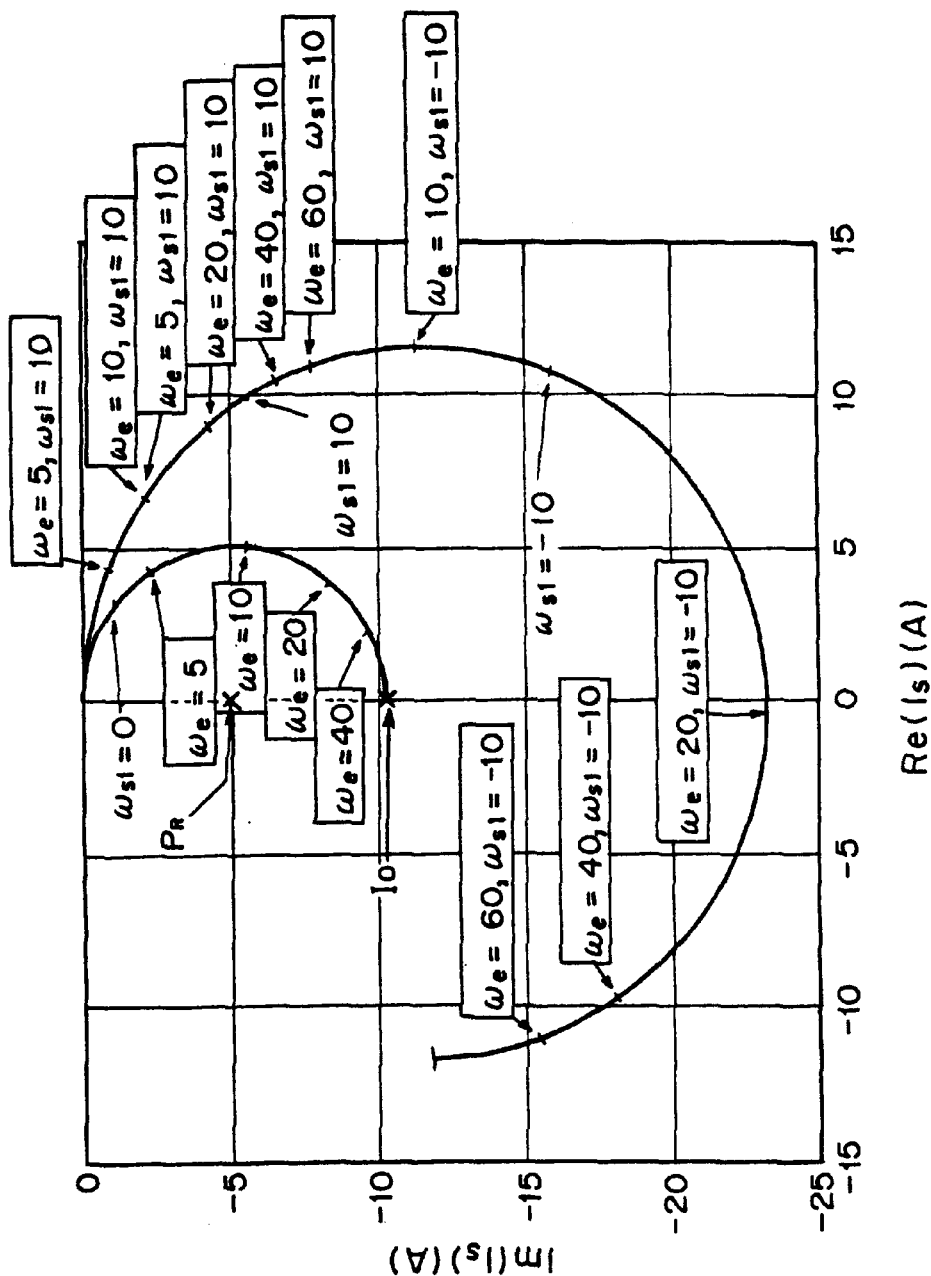
FIG. 1 is a schematic showing vector loci by a stator current $i_s$, and a point $P_R$.

First of all, the principle of the present invention is explained.

The basic idea of the present invention is to estimate, how the difference between parameters affects the evaluated current value given by the equation (2). In other words, stator resistance Rs and rotor resistance Rr are estimated by using the difference between an observed value $i_s'$ 127 and a measured value $i_s$ 124. Then, these estimated values are used to evaluate a matrix A' in the equation (2). A measured current and an observed current are referenced from a suitable point on a stator current plane without making any extra measurements, so that a degree of freedom is given to an evaluation problem. As a result, a stable evaluation can be obtained even in a regenerating operation for which the evaluation is considered to be most troublesome.

The equation (2) is substantially the same as the model equation (1) of the induction motor. Therefore, if different values are substituted for the resistance values as parameter values, the observed current for the motor of the same model, which have the different stator and rotor resistance, can be obtained. That is, by changing the parameter values in the equation (1), how the stator current varies in a stable state based on these changes can be obtained.

If the resistance values Rs and Rr are altered, both of the magnitude and the phase of the stator current change. Additionally, its way of changing depends on the motor speed and the load (slip). However, the change by the rotor resistance is almost orthogonal to that by the stator resistance except for the case where the load is "0". When the load is "0", the rotor resistance has no effect on stator current. Therefore Rr cannot be estimated in the case.

According to the present invention, both of the measured current $i_s$ and the observed current $i_s'$ are referenced as vectors which start from a suitable point $P_R=(P_{Rx}, P_{Ry})$ on a stator current vector plane. Consequently, the difference between the measured and the observed values of the current can be always associated with an estimation error between the resistances regardless of a motor speed or a load level. Especially, the difference between the phases of the observed current is' 127 and the measured current is 124 is associated with an error of the stator Resistance Rs, while the difference between their magnitudes is associated with an error of the rotor resistance Rr.

This point $P_R$ can be selected either as a unique point or as a point which varies with an operating point. As a method for obtaining a suitable point as the point $P_R$, there is a method for applying a coordinate system in a stator voltage direction to a current phasor vector.

The point $P_R$ can be selected as follows if a real axis is taken in the direction of a phasor Vs123 of the stator voltage.

$$P_{Rx} = Re(P_R) = k_{PRx}$$

$$P_{Ry} = Im(P_R) = -I_0/k_{PRy} \quad (7)$$

where $I_0$ is a nominal flux current of the motor, $$-I_0/2 < kP_{Rx} < I_0/2, \text{ and } 1 < kP_{Ry} < \infty.$$

If the point $P_R$ is set like the equation (7), the equation to be applied for obtaining the resistance values Rs and Rr is represented as follows.

$$R'_s = (k_{PR_s} + s \cdot k_{IR_s}) \cdot (i_s - P_R) \times (i'_s - P_R) \quad (8)$$

$$R'_r = (k_{PR_r} + s \cdot k_{IR_r}) \cdot (|i_s - P_R| - |i'_s - P_R|) \quad (9)$$

where × indicates a cross product of vectors and || indicates the magnitude of a vector. Additionally, $k_{IRs}$, $k_{IRr}$, $k_{PRs}$, and $k_{PRr}$ are proper gains. The cross product of the vectors in the equation is used to evaluate the phase shifting between two phasors.

FIG. 1 shows the vector loci of the stator current $i_s$, and the point $P_R$.

The vector loci generated by obtaining the stator current $i_s$ at each primary frequency $\omega e$ and a slip frequency $\omega s1$ (=$\omega e - \omega r$) are illustrated in FIG. 1. The smaller of these two loci in FIG. 1 is of the slip frequency $\omega s1 = 0$ rad/s, while the larger is of the slip frequency $\omega s1 = -10$ to 10 rad/s.

As shown in FIG. 1, the point $P_R$ is selected at a suitable position inside the locus on the stator current vector plane.

Figure 2:
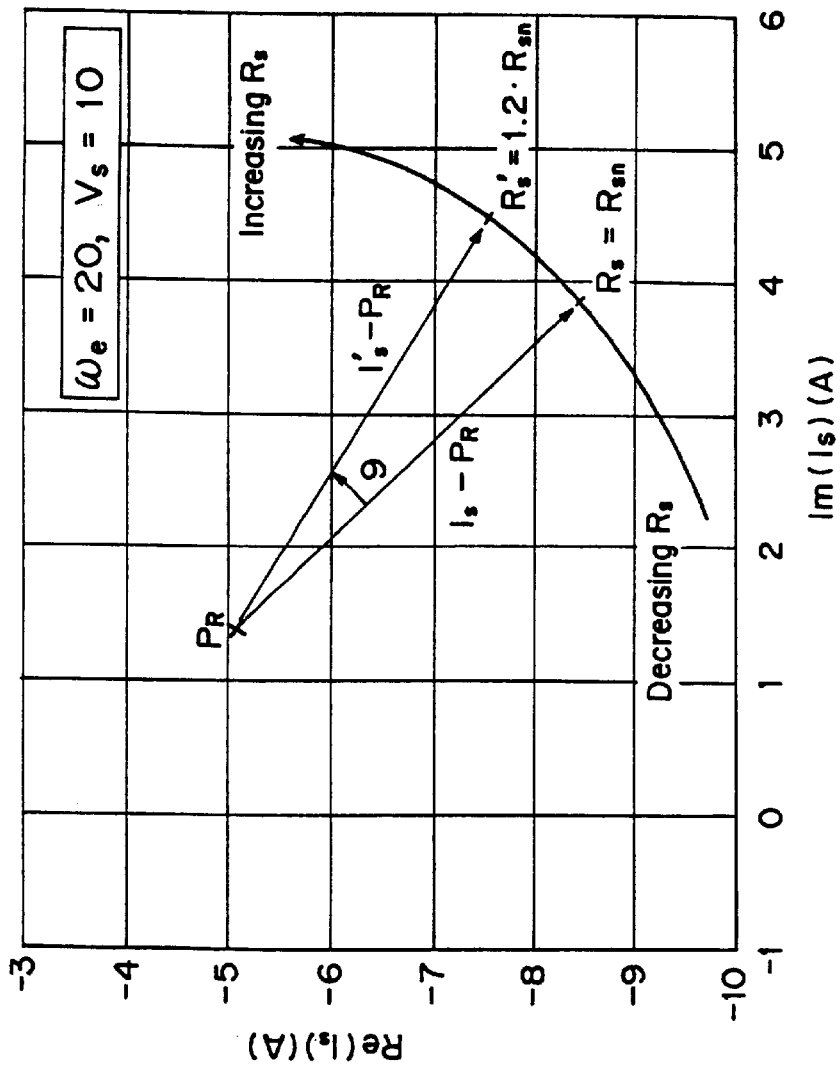
FIG. 2 is a schematic showing the vector starting from the point $P_R$ to the measured and observed values of the stator current.

FIG. 2 shows the vector starting from the point $P_R$ to the measured and the observed values of the stator current.

In this figure, the measured value $i_s$ and the observed value $i_s'$ of the stator current on the vector locus are represented as vectors is-Pr and is'-$P_R$ which start from the point $P_R$ selected inside the vector locus. As a result, a phase shift θ is associated with the stator resistance Rs' according to the equation (8), while the difference between the magnitudes of the vectors $|Is-P_R|-|Is'-P_R|$ is associated with the rotor resistance Rr' according to the equation (9).

Figure 3:
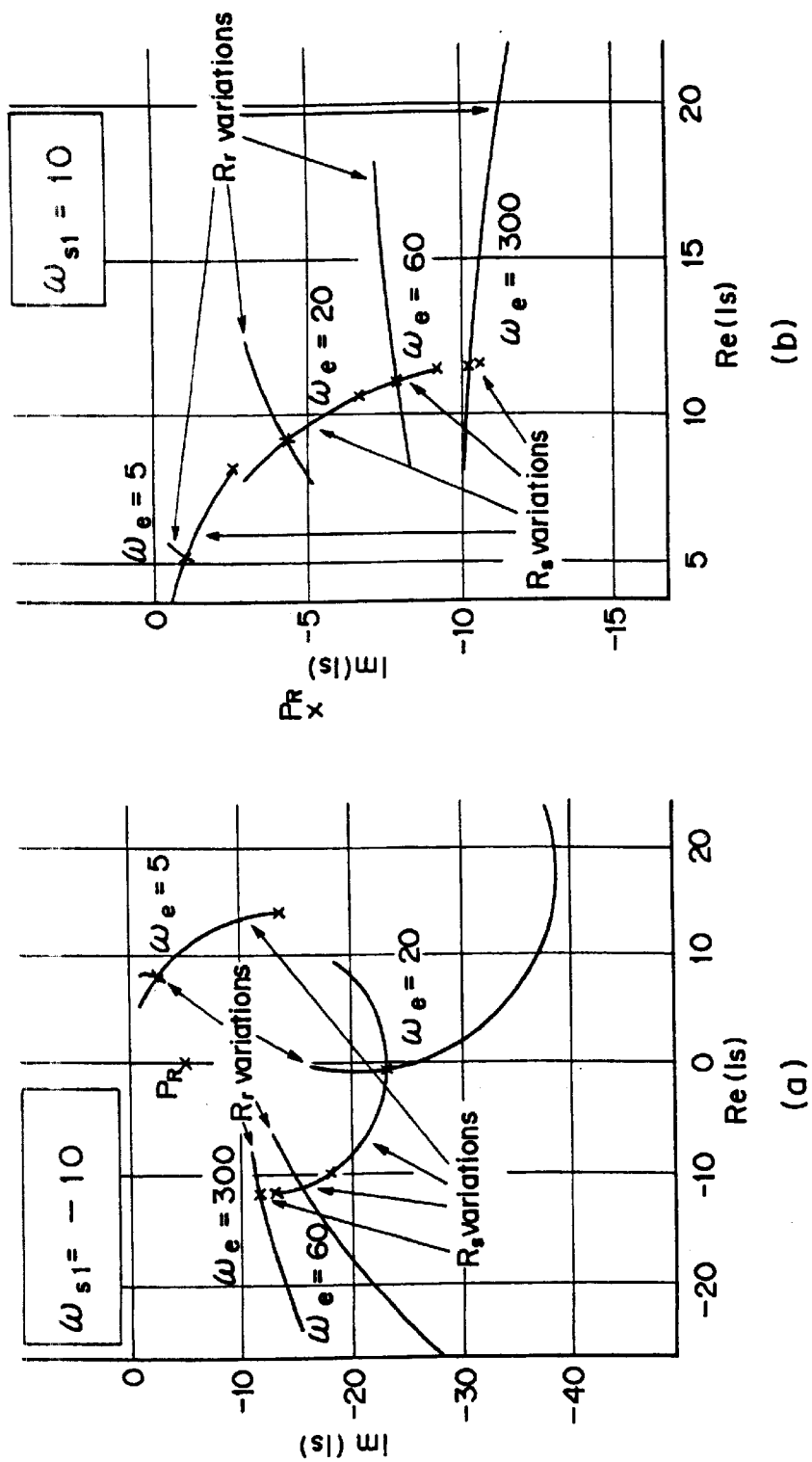
FIG. 3A is a schematic showing the vector locus of the stator current when resistances have various values at the time of a slip frequency $\omega s1=-10$ rad/s.
FIG. 3B is a schematic showing the vector locus of the stator current when resistances have various values at the time of a slip frequency $\omega s1=10$ rad/s.

FIGS. 3A and 3B are schematics showing the vector loci of the stator current $i_s$ and the point $P_R$ when the stator resistance Rs and the rotor resistance Rr have various values.

Also in these figures, by taking the point $P_R$ inside the vector loci, the stator resistance Rs and the rotor resistance Rr can be estimated based on the difference between the magnitudes or between the phases of the vectors starting from the point $P_R$ for the measured value $i_s$ and the observed value $i_s'$ of the stator current, with a method similar to those shown in FIGS. 1 and 2.

Furthermore, in the system comprising no speed sensor nor a position sensor, it is known that the rotor resistance cannot be estimated in a steady state if the flux level is kept constant. Therefore, the rotor resistance can be observed even in a stable state by injecting a suitable harmonic signal 162 having a frequency f* in the flux current 113 in the above described system.

Accordingly, if the resistance value is estimated with a method similar to that for the system comprising a speed sensor described so far, the equation (8) is applied unchanged to the estimation of the stator resistance Rs. However, the rotor resistance Rr is estimated not according to the equation (9) but based on the difference between the harmonic component id'* 154 of an observed stator current and the harmonic is component id* 153 of the measured stator current. Therefore, the rotor resistance Rr is estimated by taking a suitable point $P_{Rr}$255 on a time-phasors plane and by referencing the measured and the observed values of a harmonic current from this point $P_{Rr}$255.

If the point $P_{Rr}$ is selected so that a change in the size of an observed harmonic current is associated with a resistance error, the adaptation law for obtaining the observed resistance Rr' will be:

$$R'_r = (k_{PRr} + s \cdot k_{IRr}) \cdot (|i^*_d - P_{Rr}| - |i^{*'}_d - P_{Rr}|) \quad (10)$$

The point $P_{Rr}$ is evaluated from a measured d-axis harmonic voltage vd* 152 which determines the coordinate axis on the d-axis harmonic time-phasors plane.

The harmonic stator current of the same frequency f* as that of an injected harmonic signal 162 can be evaluated for each of different rotor resistance values with the equation (1). If Id1* and Id2* are respectively defined to be the currents corresponding to a half and a double of the nominal rotor resistance, and if the real axis in the direction of the f* harmonic stator voltage time-phasor vd* 152 is assumed, Id1* and Id2* are represented as follows.

$$i^*_{d1} = a_1 + jb_1$$

$$i^*_{d2} = a_2 + jb_2 \quad (11)$$

where $a_1$, $a_2$, $b_1$, and $b_2$ are real constants which depend on motor parameters. The point $P_{Rr}$ is selected from on straight lines determined by two points Id1* and Id2* in the equation (11).

$$P_{Rrx} = Re(P_{Rr}) = k_{PRr} \quad (12)$$

$$P_{Pry} = IM(P_{Rr}) = \frac{b_2 - b_1}{a_2 - a_1} \cdot k_{PRr} + b_2 - \frac{b_2 - b_1}{a_2 - a_1} \cdot a_2$$

where $k_{PRr}$ is an arbitrary real number. This selection of the point $P_{Rr}$ based on the equation (12) leads to the adaptation law of the equation (10) for obtaining the observed resistance Rr'. Here, the point $P_{Rr}$ is obtained by defining Id1* and Id2* to be the currents corresponding to the half and the double of the nominal rotor resistance. However, the points determining the straight line for obtaining the point $P_{Rr}$ are not limited to the above described ones as long as they are suitable current values which correspond to rotor resistance values larger and smaller than the nominal rotor resistance value.

Figure 4:
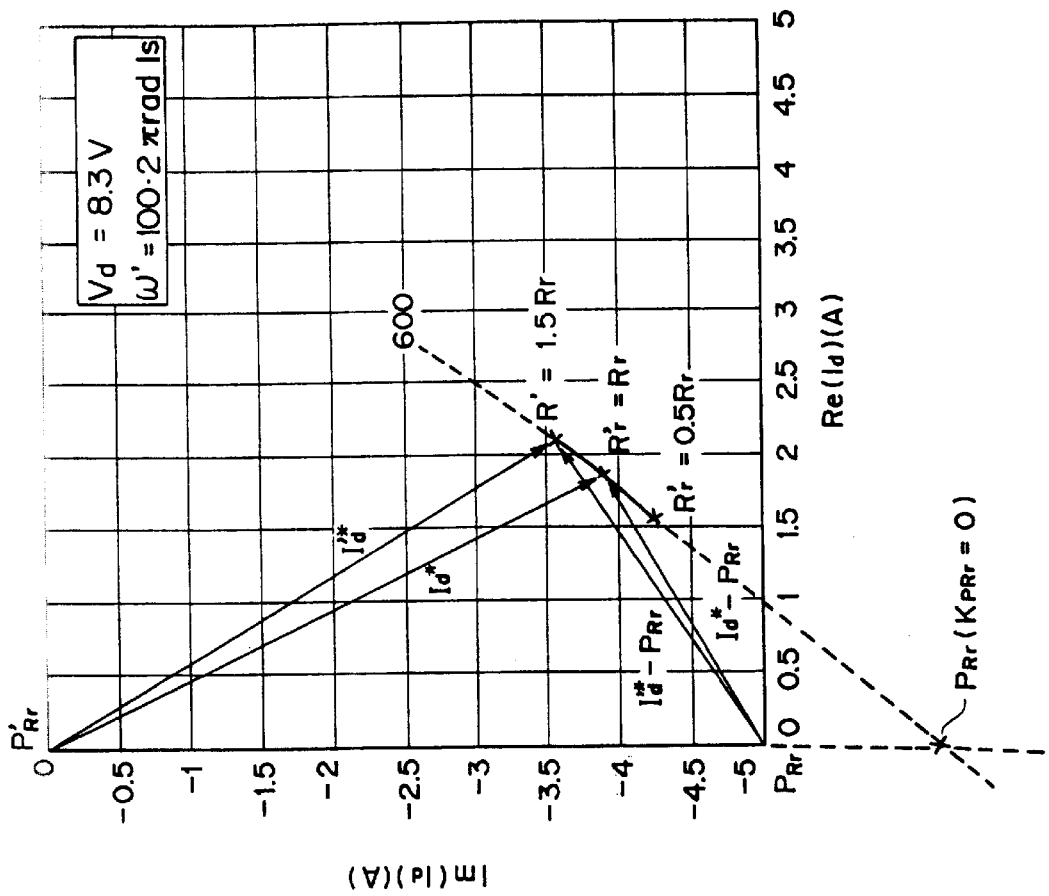
FIG. 4 exemplifies a selection of the point $P_{Rr}$.

FIG. 4 shows an example of the selection of the point $P_{Rr}$.

In this figure, a straight line 600 is obtained from the current values corresponding to the half (0.5Rr) and the one and a half (1.5Rr) of the nominal rotor resistance Rr. Then, the point $P_{Rr}$ is set on the straight line 600, and the harmonic component id'* 154 of the observed stator current and the harmonic component id* 153 of the measured stator current are referenced by obtaining the vector starting from the point $P_{Rr}$, so that the rotor resistance Rr can be estimated according to the equation (10). In FIG. 4, the point obtained by setting $k_{PRr}$ in the equation (12) to "0" is selected.

An example of the system of the induction motor drive to which the present invention is applied is explained next.

Figure 5:
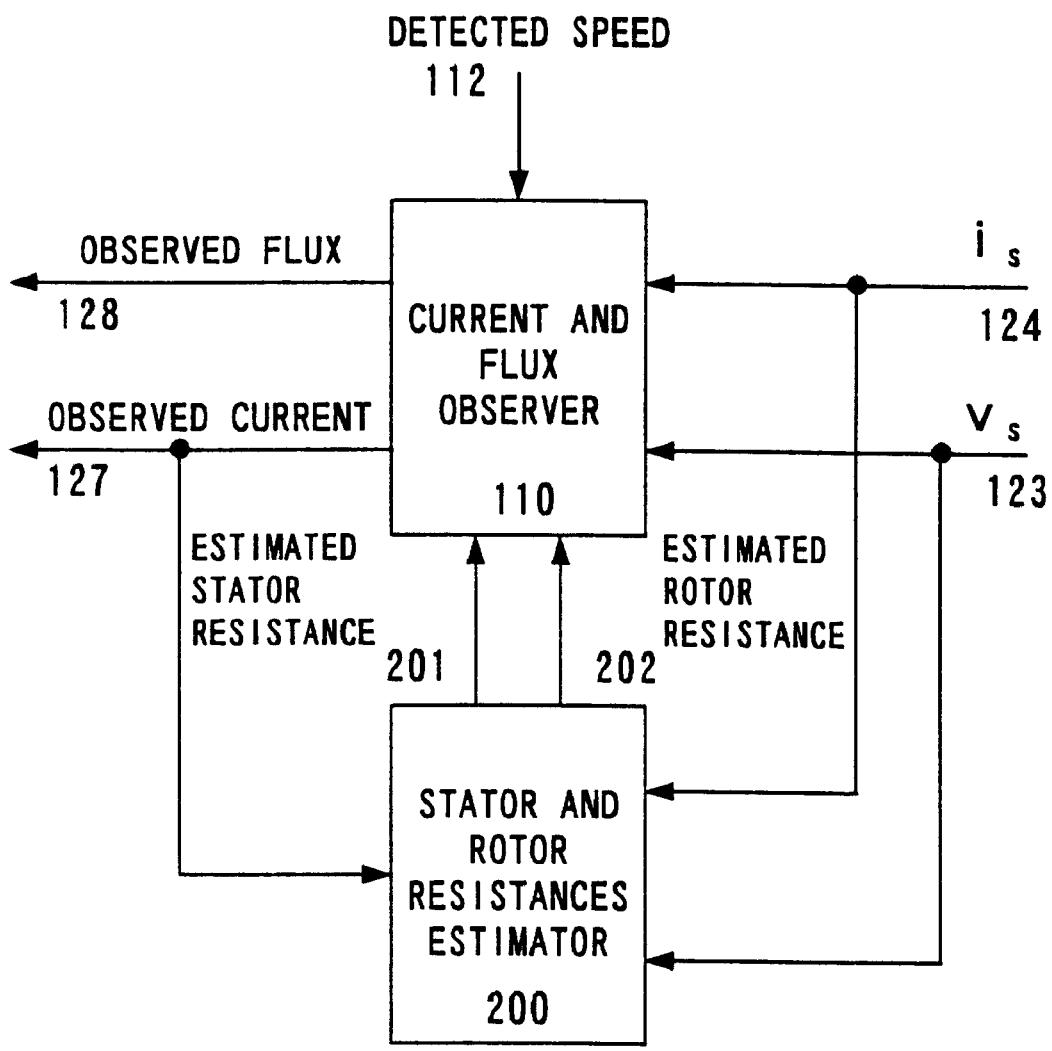
FIG. 5 is a block diagram showing the configuration of a system according to a first preferred embodiment.

FIG. 5 is a block diagram showing the system which comprises a speed sensor and is used when a motor speed is measured with the speed sensor, as a first preferred embodiment. The block diagram of FIG. 5 shows only the portion different from that in the configuration shown in FIG. 12.

Figure 12:
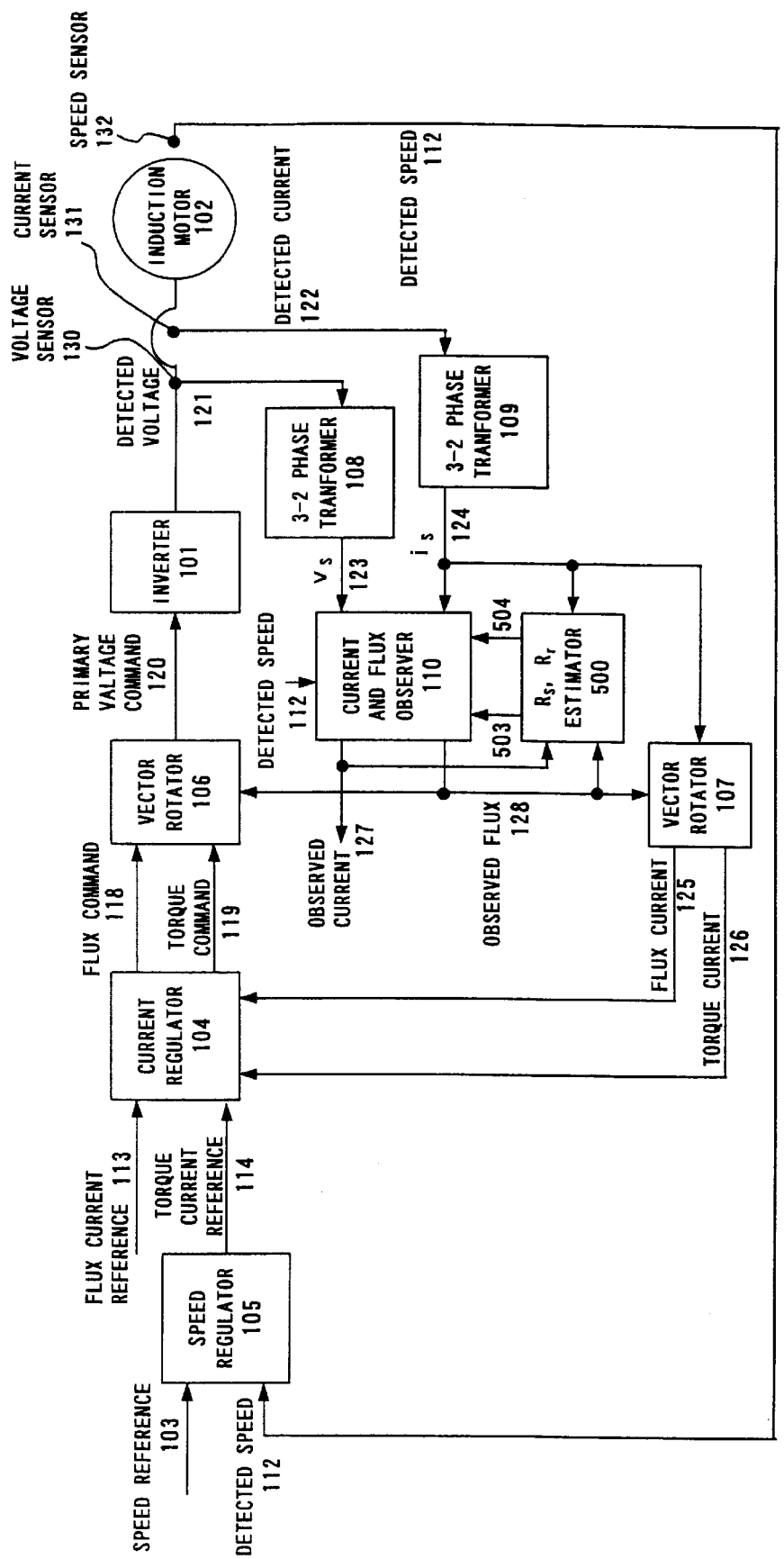
FIG. 12 is a block diagram showing the configuration of the system of a direct field-oriented induction motor drive comprising a speed sensor.

In this system, a stator and rotor resistances estimator 200 is arranged as a replacement of the Rs,Rr estimator 500 shown in FIG. 12, along with the current and flux observer 110.

This stator and rotor resistances estimator 200 outputs stator resistance Rs 201 and rotor resistance Rr 202 from the observed current 127, the measured current 124, and the measured voltage 123. The estimated stator resistance Rs 201 and the estimated rotor resistance Rr 202 are used to calculate the dynamic matrix A' in the equation (2) by the observer 110.

Figure 6:
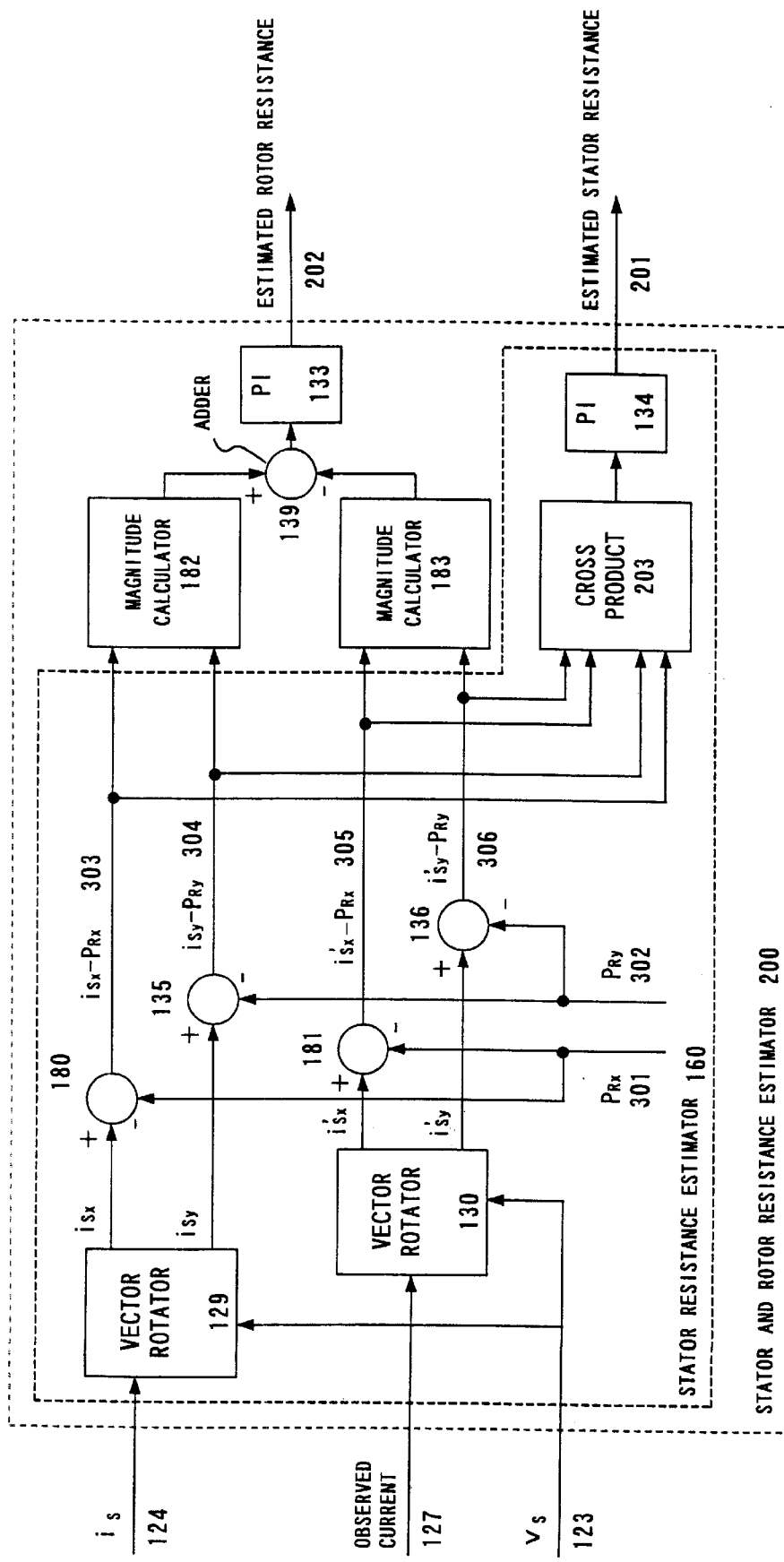
FIG. 6 shows the details of a stator and rotor resistance estimator 200 shown in FIG. 5.

FIG. 6 is a block diagram showing the details of the stator and rotor resistances estimator 200 shown in FIG. 5.

To apply the evaluation algorithm according to the equations (8) and (9), the measured current $i_s$ 124 and the observed current $i_s'$ 127 are first vector-rotated, and transformed into the components within a coordinate system, which are oriented toward the direction of the stator voltage Vs 123. Then, $P_R$ components $P_{Rx}$, 301 and $P_{Ry}$ 302, which are determined by the equation (7), are subtracted from the vectors $i_s(i_{Sx}, i_{Sy})$ and $i_s'$ $(i_{Sx'}, i_{Sy'})$ by calculators 180, 181, 135, and 136, so that vectors $i_s - P_R (i_{Sx} - P_{Rx}$ 303, $i_{Sy} - P_{Ry}$ 304) and $i_s' - P_R (i_{Sx'} - P_{Rx}$ 305, $i_{Sy'} - P_{Ry}$ 306) are obtained.

The phase shifts between these vectors are calculated by a cross product processor 203. After their magnitude differences are transformed into scalar quantities by magnitude calculators 182 and 183, the transformed quantities are subtracted by an adder 139. Then, the estimated stator resistance value Rs' based on the equation (8) is calculated and output from the cross product of the two vectors $i_s - P_R$ and $i_s' - P_R$ by a PI control 134. Additionally, the estimated rotor resistance Rr' based on the equation (9) is obtained from the difference between the absolute values, and output by a PI control 133.

Next, a second preferred embodiment according to the present invention is explained.

Figure 7:
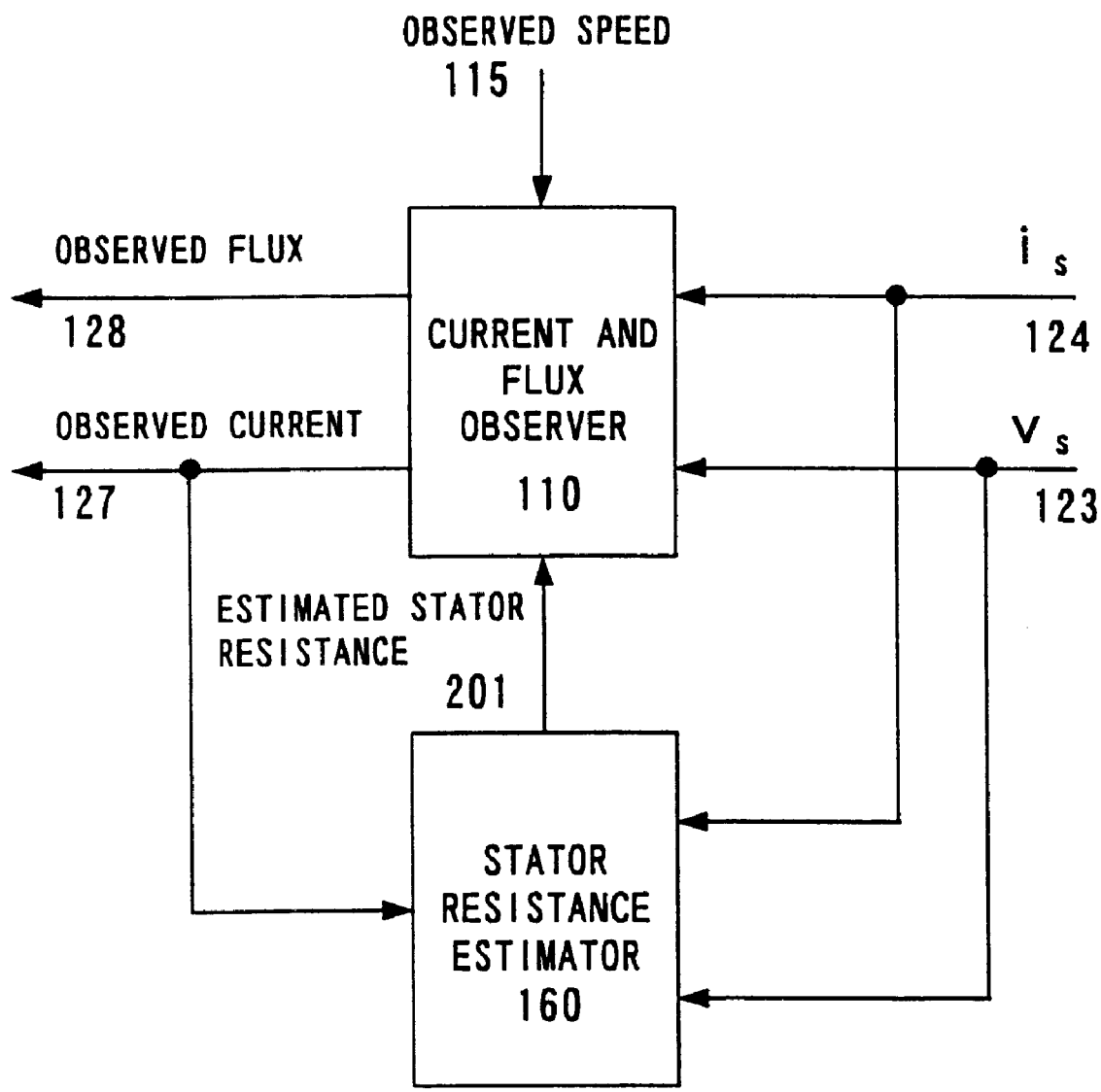
FIG. 7 is a block diagram showing the configuration of a system according to a second preferred embodiment.

FIG. 7 is a block diagram showing the configuration of the system which does not comprise a speed sensor, and is used when a motor speed is not measured, as the second preferred embodiment. The block diagram of this figure shows only the portion different from that in the configuration shown in FIG. 13.

Figure 13:
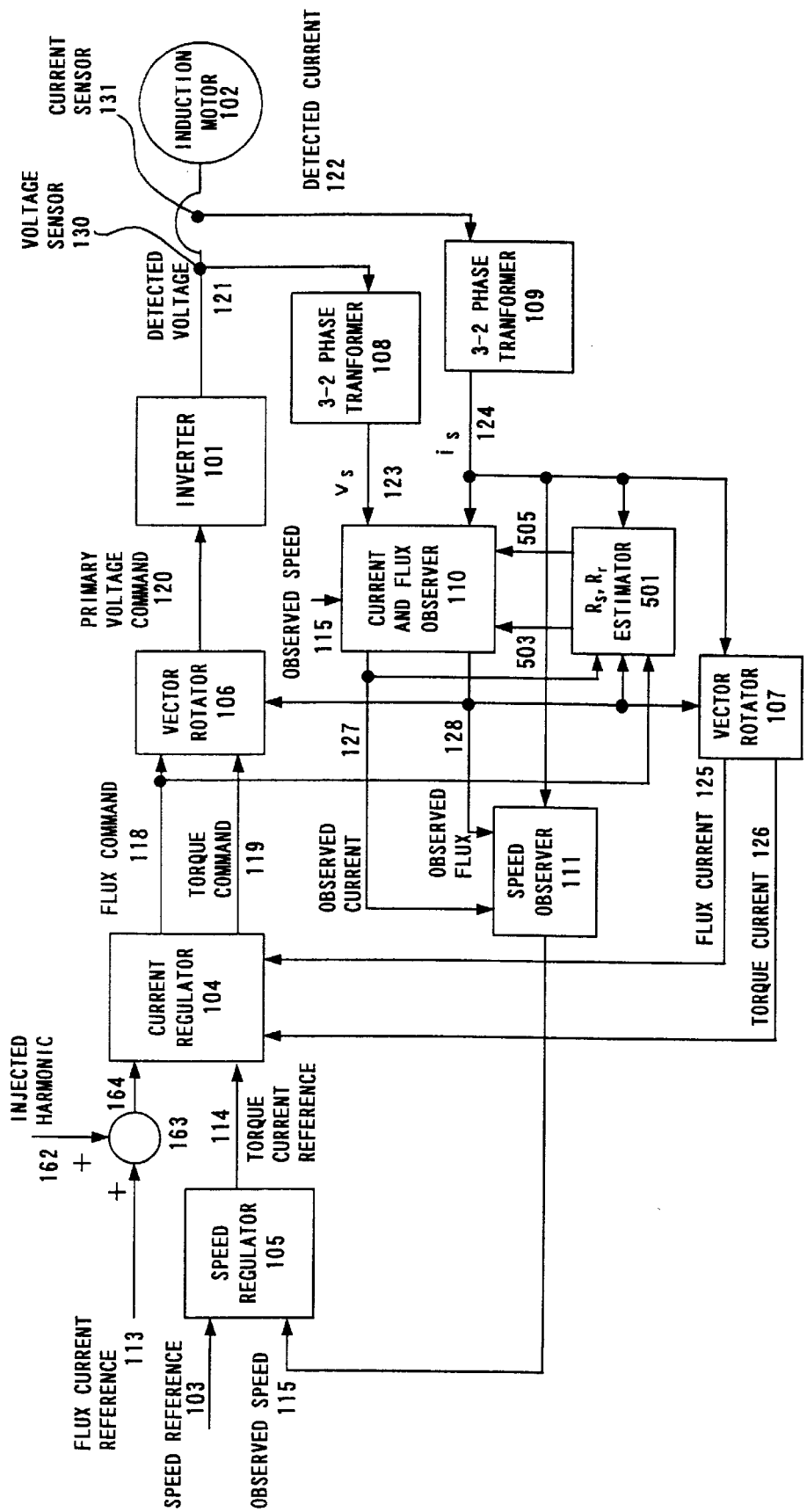
FIG. 13 is a block diagram showing the configuration of the system of an induction motor drive comprising no speed sensor.
Figure 14:
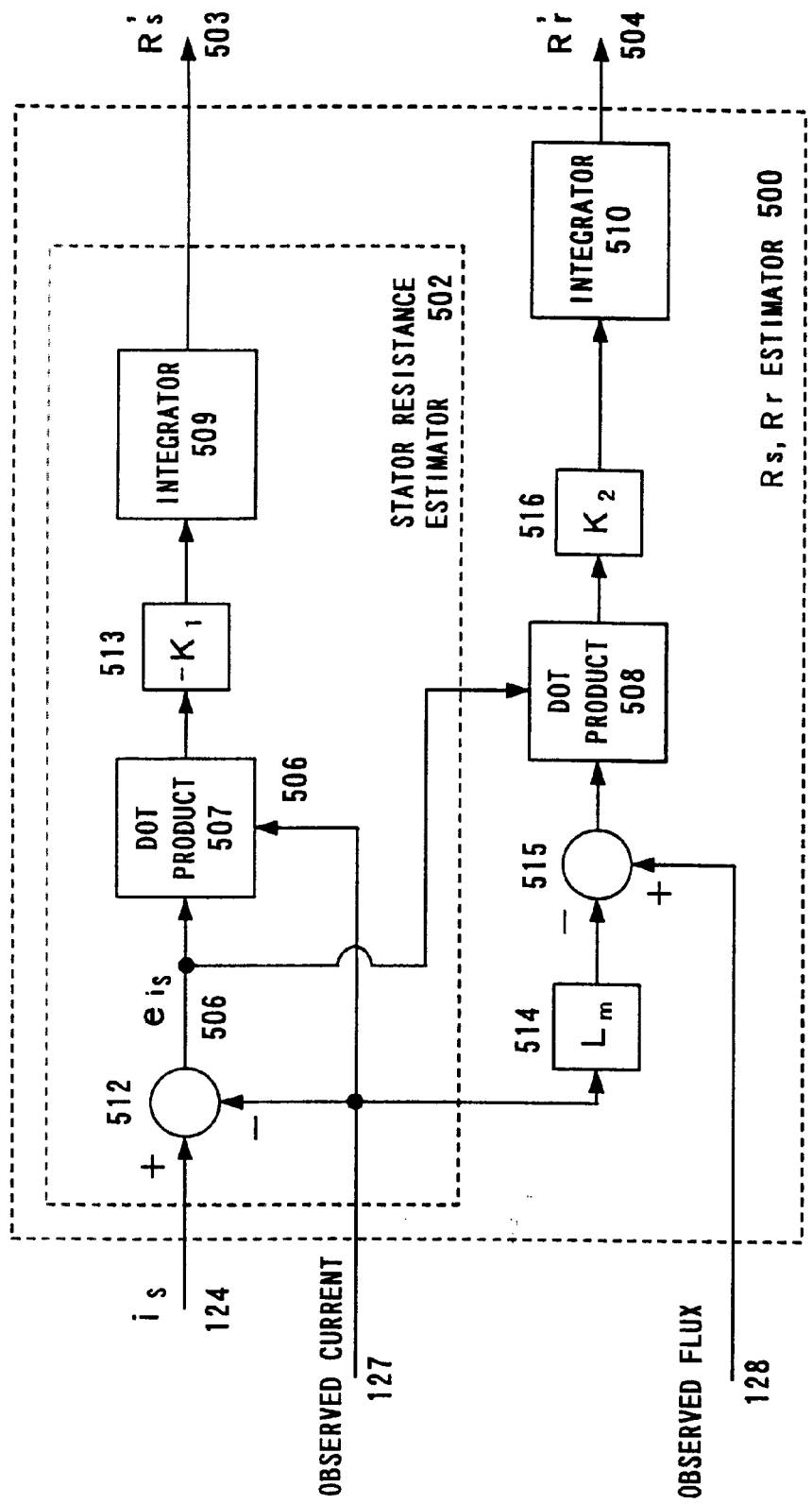
FIG. 14 is a block diagram showing the details of an Rs,Rr estimator 500.
Figure 15:
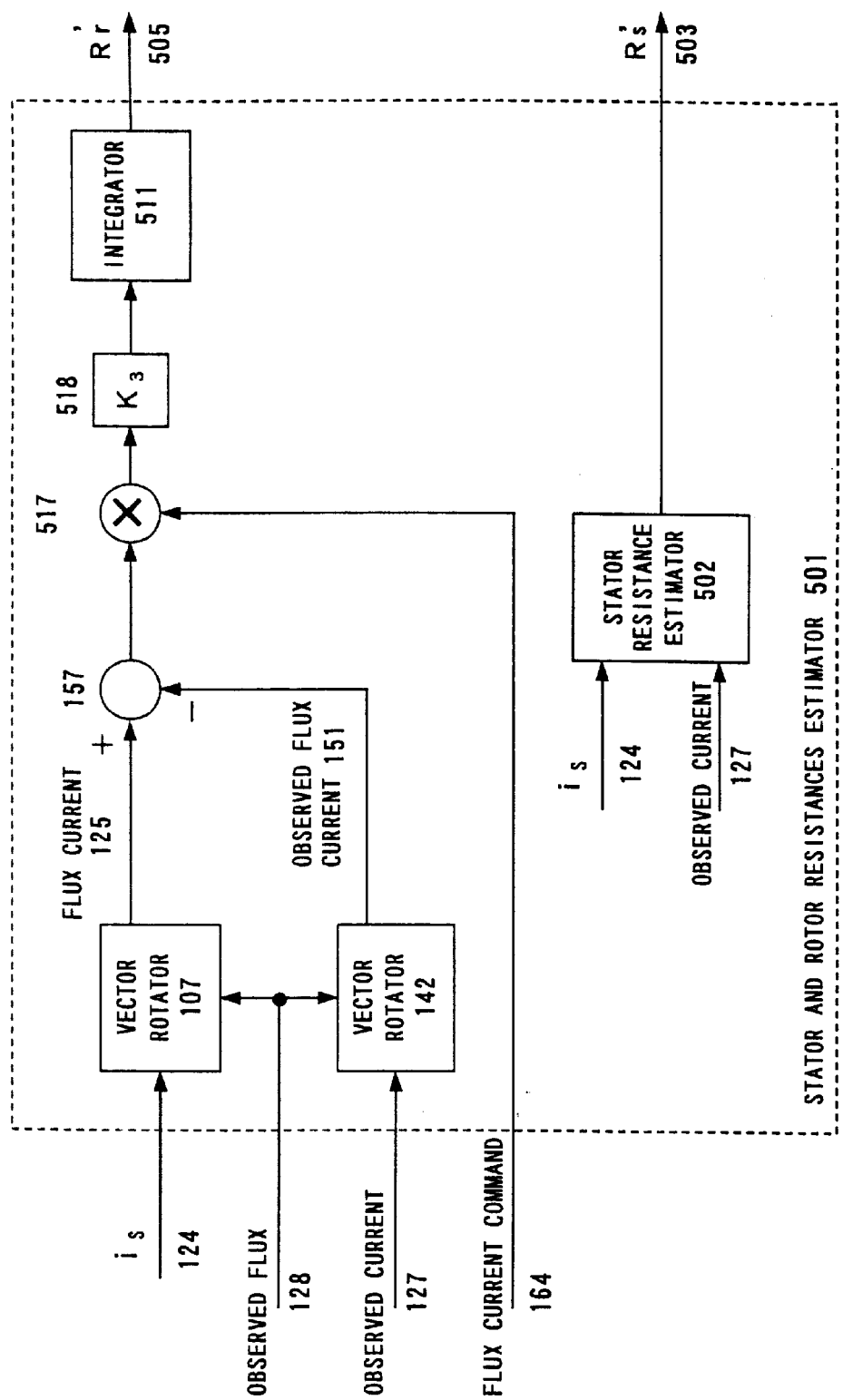
FIG. 15 is a block diagram showing the details of an Rs,Rr estimator 501.

In the system shown in FIG. 7, a stator resistance estimator 160 is arranged as a replacement of the Rs,Rr estimator 501 shown in FIG. 13, along with the current and flux observer 110.

This stator resistance estimator 160 is the same as that 160 shown in FIG. 6, and outputs the estimated stator resistance Rs 201 from the observed current 127, the measured current 124, and the measured voltage 123. The observer 110 calculates the dynamic matrix A' in the equation (2) from the estimated stator resistance Rs 201 and the observed speed 115.

Next, a third preferred embodiment according to the present invention is explained.

The system according to the third preferred embodiment is used when rotor resistance is estimated without measuring a rotation speed. Accordingly, this embodiment is suitable for a reasonably high-speed motor for which stator resistance is not required to be adapted.

Figure 8:
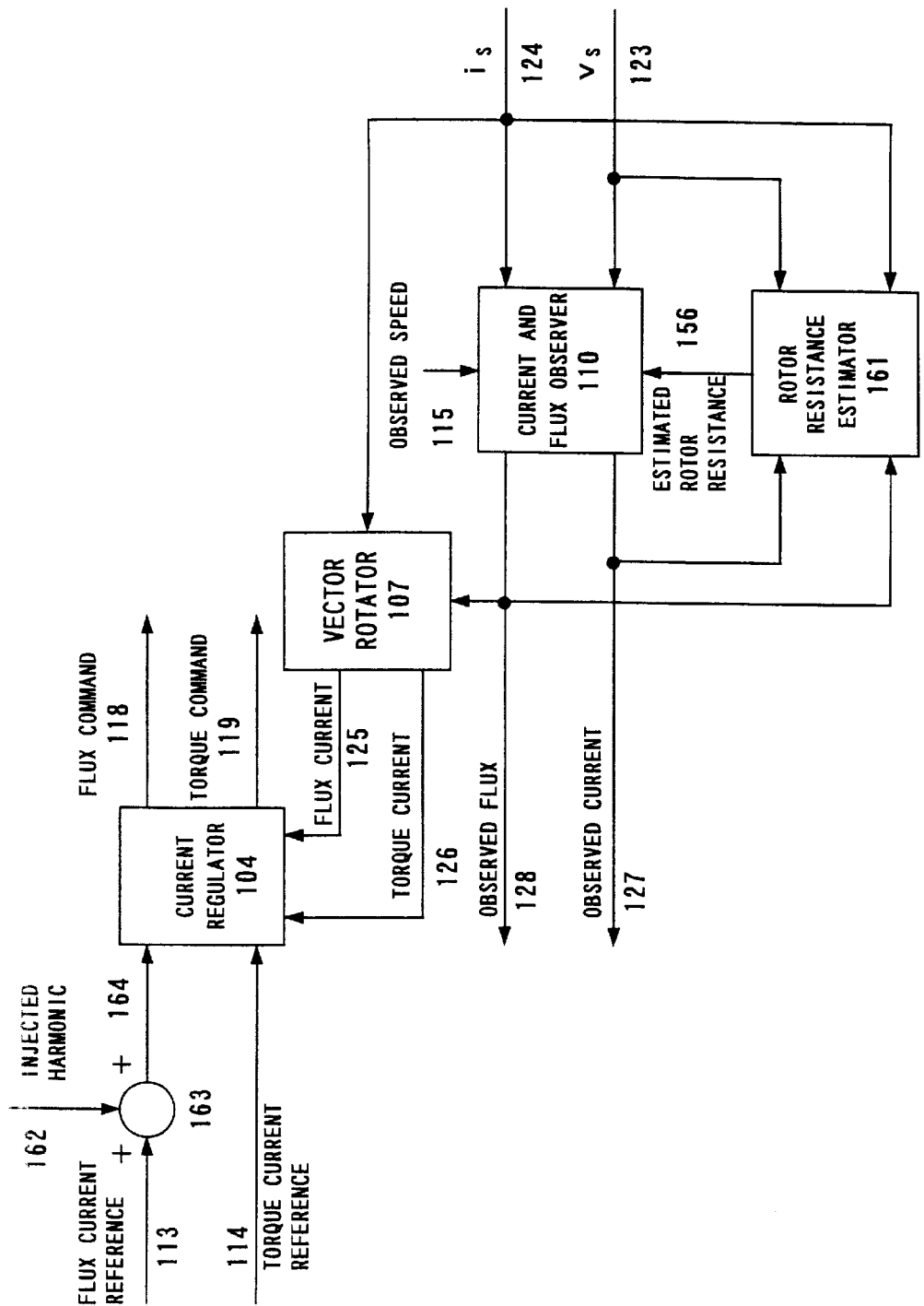
FIG. 8 is a block diagram showing the configuration of a system according to a third preferred embodiment.

FIG. 8 is a block diagram showing the configuration of the system according to the third preferred embodiment. This preferred embodiment takes the configuration of the system comprising no speed sensor in FIG. 13 as a basis. The block diagram in FIG. 8 only shows the portion different from that in the configuration shown in FIG. 13.

In the system shown in FIG. 8, a rotor resistance estimator 161 is arranged as a replacement of the Rs,Rr estimator 501 shown in FIG. 13, along with the current and flux observer 110.

By injecting a suitable harmonic signal having a frequency f* in the flux current 113 as an injection term 162, the rotor resistance can be observed even in a stable state.

The rotor resistance estimator 161 outputs estimated rotor resistance 156 by using not only the observed current 127 and the observed flux 128, but also the measured current 124 and the measured voltage 123. The estimated rotor resistance (Rr') 156 is used to calculate the dynamic matrix A' in the equation (2) by the observer 110.

Figure 9:
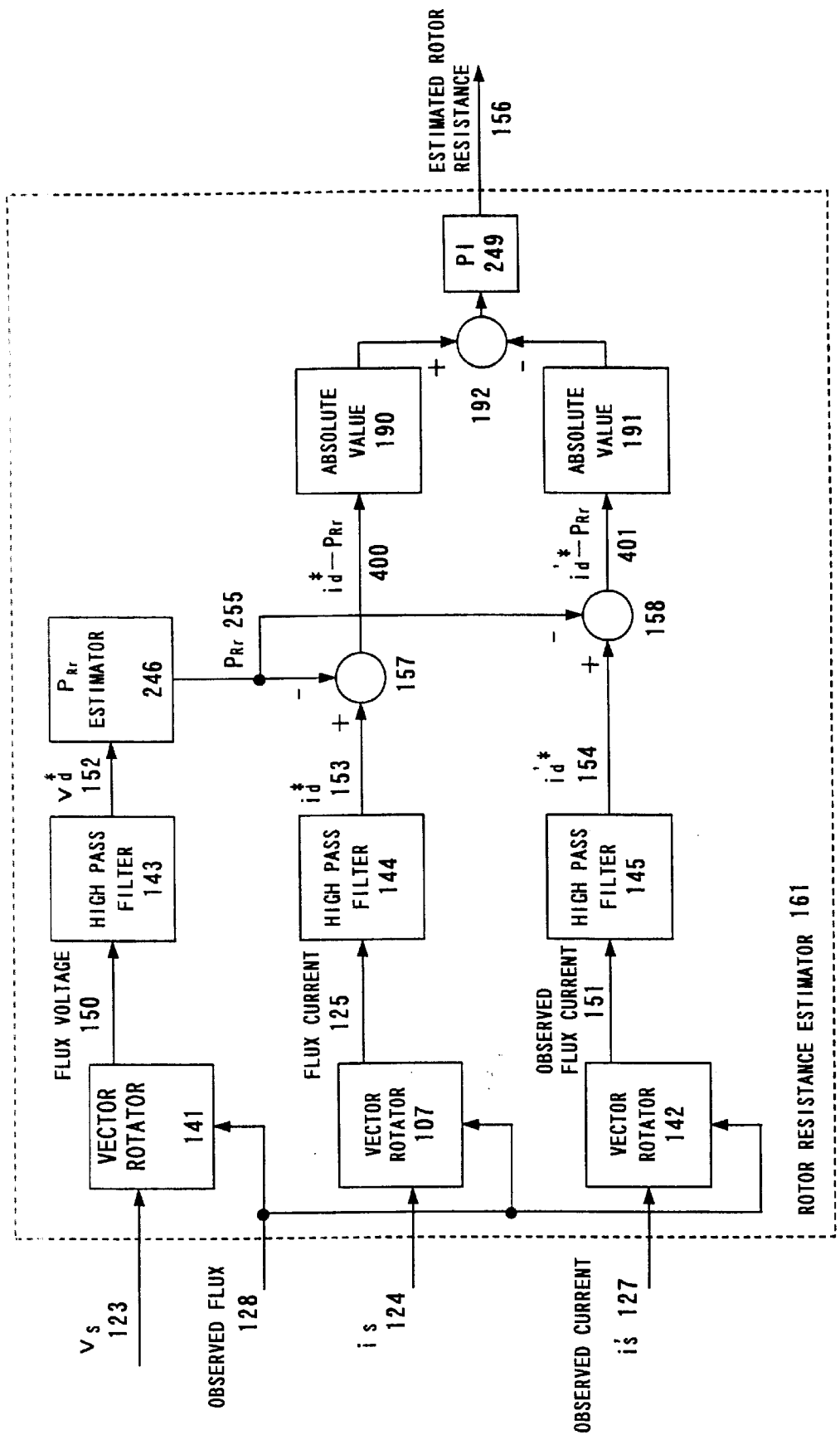
FIG. 9 shows the details of the rotor resistance estimator 161 shown in FIG. 8.

FIG. 9 is a block diagram showing the details of the rotor resistance estimator 161 which is shown in FIG. 8 and based on the equation (10).

The measured current $i_s$ 124 and the observed current $i_s'$ 127 as well as the rotor voltage Vs 123 are vector-rotated by vector rotators 141, 107, and 102, and are transformed into flux components. Only harmonic components are filtered from the flux components such as a flux voltage 150, a flux current 125, andan observed flux voltage 151 by high-pass filters 143, 144, and 145.

The harmonic stator voltage Vd* 152 is used to determine a point $P_{Rr}$ 255 according to the equation (12) by a $P_{Rr}$ estimator 246.

In the meantime, after the harmonic stator current id* 153 and its observed value id'* 154 are transformed into the vectors which start from the point $P_{Rr}$ output from the $P_{Rr}$ estimator 246 by calculators 157 and 158, they are transformed into scalar quantities by absolute value transformers 190 and 191.

Then, the estimated rotor resistance Rr' 156 is obtained from the difference between the instantaneous absolute values of two vectors id*−$P_{Rr}$ 400 and id'*−$P_{Rr}$ 401, which is obtained by a calculator 192, based on the equation (10), and output by a PI control 249.

Figure 10:
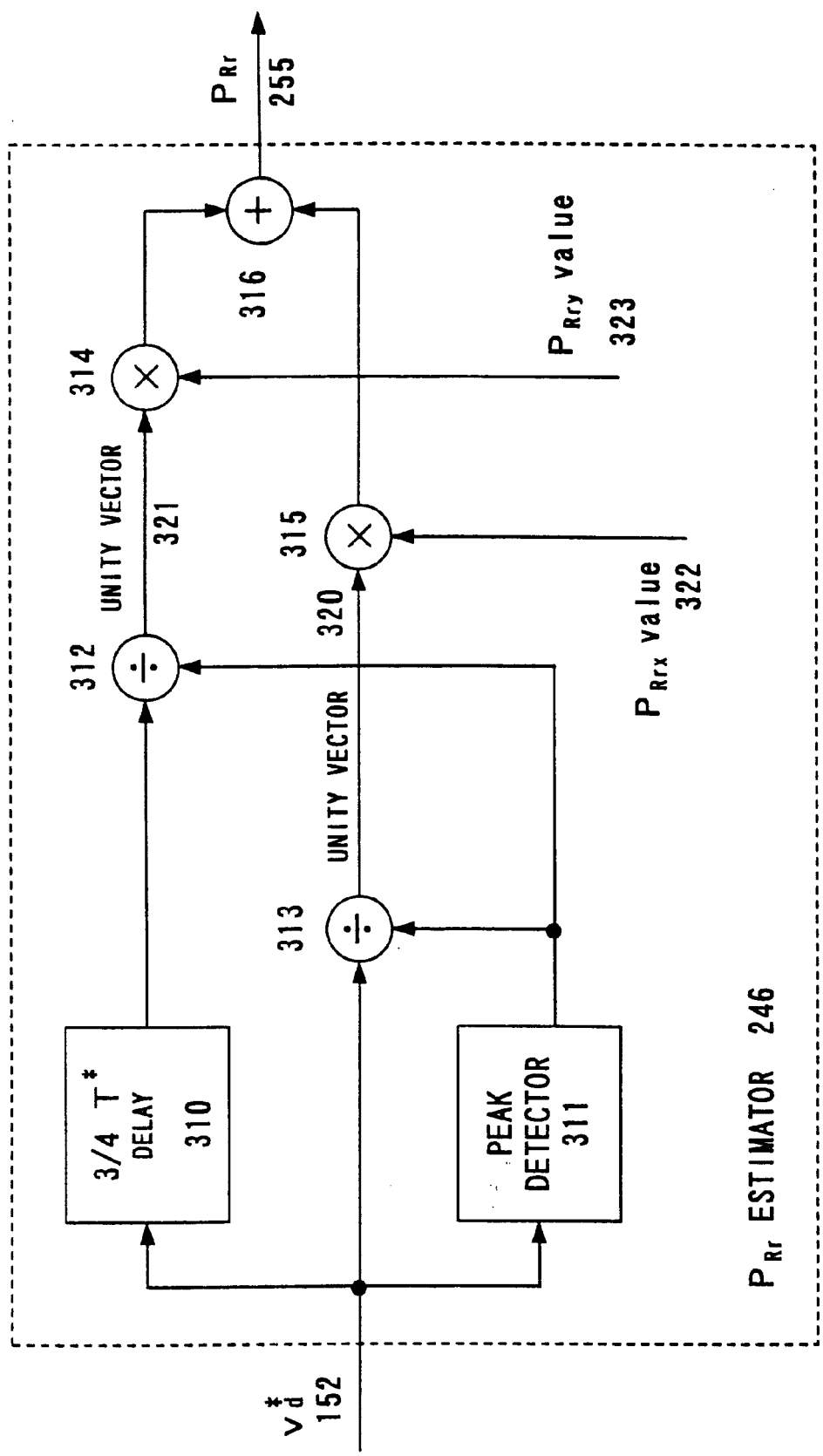
FIG. 10 is a block diagram showing the details of the $P_{Rr}$ estimator shown in FIG. 9.

FIG. 10 is a block diagram showing the details of the $P_{Rr}$ estimator 246 shown in FIG. 9.

The harmonic stator voltage 152 input to the $P_{Rr}$ estimator 246 from the high-pass filter 143 is input to a ¾ T* delay circuit 310, a peak detector 311, and a calculator 313 within the $P_{Rr}$ estimator 246.

Then, the instantaneous Vd* value 152 is divided by the peak value of Vd* from the peak detector 311 by a calculator 313, so that a unity time-phasor 320 in the same direction as that of the harmonic stator voltage Vd* 152 is obtained. Similarly, the input signal vd* that the delay circuit 310 delays by ¾ T* is divided by its peak value by means of an operator 312, so that a unity time-phasor 321 orthogonal to vd* 152 is obtained. With the unity time-phasors 320 and 321, the orthogonal coordinate system on the time-phasors plane which has a real coordinate associated with the harmonic stator voltage Vd* is determined.

The point $P_{Rr}$ 255 is determined simply by multiplying the values from the equation (12) for $P_{Rrx}$ 322 and $P_{Rry}$ 323 and the unity time-phasors 320 and 321, and by adding the instantaneous values of the obtained unity time-phasors by means of an adder 316.

Figure 11:
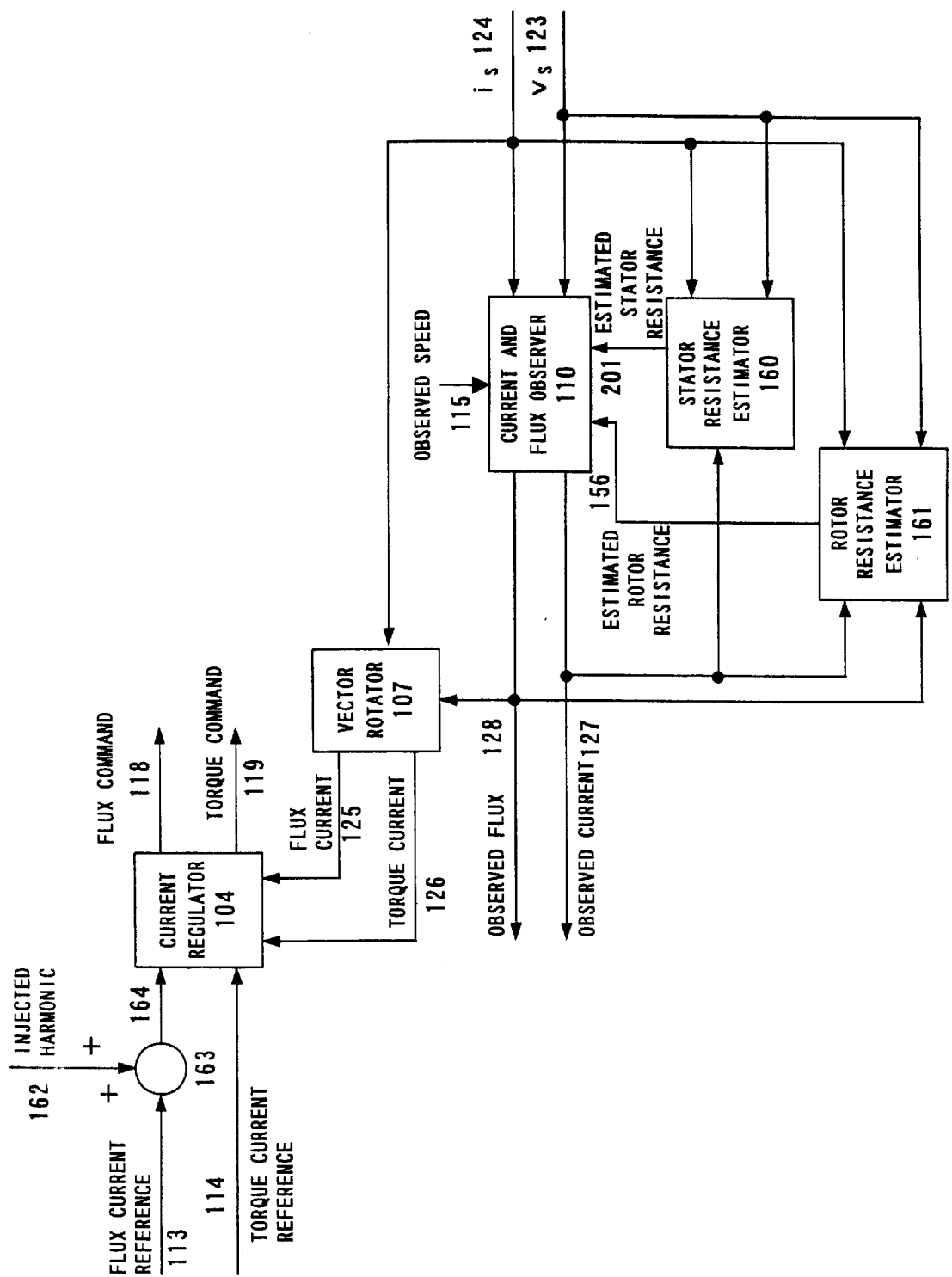
FIG. 11 is a block diagram showing the configuration of a system according to a fourth preferred embodiment.

FIG. 11 is a block diagram showing the configuration of a system according to a fourth preferred embodiment. The fourth preferred embodiment takes the configuration of the system comprising no speed sensor in FIG. 13 as a basis. The block diagram of FIG. 11 shows only the portion different from that in the configuration shown in FIG. 13.

The fourth preferred embodiment has a configuration where no speed sensor is comprised. Accordingly, the rotor resistance can be observed even in a stable state by injecting a suitable harmonic signal having a frequency f* in the flux current 113 as an injection term 162.

The system shown in FIG. 11 is used in the case where both of the stator resistance Rs and the rotor resistance Rr are to be estimated without measuring the rotor speed.

In the system shown in FIG. 11, the stator resistance estimator 160 shown in FIG. 6 and the rotor resistance estimator 161 shown in FIG. 7 are arranged along with the current and flux observer 110. These estimators 160 and 161 use the measured current 124 and the measured voltage 123 as well as the observed current 127, and outputs the estimated stator resistance 201 and rotor resistance 156. Furthermore, the rotor resistance estimator 161 uses also the observed flux 128 for the estimation of the rotor resistance. The estimated resistance Rs' of the stator and the estimated resistance Rr' of the rotor are used to calculate the dynamic matrix A' in the equation (2) by the observer 110.

According to the present invention, by measuring only a stator current value, each state of an induction motor can be estimated from this current value.

Additionally, the above described algorithm is used to estimate the stator resistance and the rotor resistance, so that the flux level and the rotation torque of a motor drive can be controlled over an entire operation range.

Furthermore, the estimation for the stator resistance and the rotor resistance is performed according to the difference between the measured and the observed values of the stator current, thereby making an estimation even in the operation of the motor.

Still further, since the respective resistance values are estimated as the motor temperature changes, whereby a performance degradation such as a control precision degradation, etc. does not occur.

Still further, the resistance values are estimated by referencing the measured and the observed currents from a suitable point on the stator current vector plane, so that a stable estimation can be implemented at the time of not only a motoring operation but also a regenerating operation.

What is claimed is:

1. A control system performing a vector control of an induction motor using a speed sensor, comprising:
   a first reference point setting unit setting a point $P_R$ at an arbitrary position on a stator current vector plane;
   a first vector transforming unit transforming a measured and observed values of a stator current of the induction motor into vectors starting from the point $P_R$ on the stator current vector plane;
   a magnitude calculating unit obtaining difference between magnitudes of the vectors transformed by said first vector transforming unit for the measured and observed values;
   a phase difference calculating unit obtaining a difference between phases of the vectors transformed by said first vector transforming unit for the measured and observed values;
   a first rotor resistance estimating unit estimating a rotor resistance of the induction motor from the difference between magnitudes; and
   a stator resistance estimating unit estimating a stator resistance of the induction motor from the difference between phases.

2. The control system according to claim 1, wherein:
   the first rotor resistance estimating unit estimates the rotor resistance of the induction motor according to an equation:

$$R'r=(k_{PRr}+s \cdot k_{IRr}) \cdot (|i_s-P_R|-|i'_s-P_R|)$$

Wherein:
   R'r—an estimated value of the rotor resistance;
   $i_s$—the measured value of the stator current;
   $i'_s$—the observed value;
   s—a Laplace operator;
   $k_{Irr}$ and $k_{PRr}$—gains.

3. The control system according to claim 1 wherein said first reference point setting unit sets the point $P_R$ at a position inside a vector locus of the stator current: on the stator current vector plane.

4. The control system according to claim 1, wherein the stator resistance estimating unit estimates the stator resistance according to an equation $$R's=(k_{PRs}+s \cdot k_{IRs}) \cdot (/i_s-P_R/-/i'_s-P_R/)$$

Wherein:
   R's—an estimated value of the stator resistance;
   $i_s$—the measured value of the stator current;
   $i'_s$—the observed value;
   s—a Laplace operator;
   $k_{IRs}$ and $k_{PRs}$—gains.

5. A control system performing a vector control of an induction motor using no speed sensor, comprising:
   a first reference point setting unit setting a point $P_R$ at an arbitrary position on a stator current vector plane;
   a first vector transforming unit transforming measured and observed values of a stator current of the induction motor into vectors starting from the point $P_R$ on the stator current vector plane;
   a phase difference calculating unit obtaining a difference between phases of the vectors transformed by said first vector transforming unit for the measured and observed values; and
   a stator resistance estimating unit estimating a stator resistance of the induction motor from the difference between phases.

6. The control system according to claim 5, wherein said first reference point setting unit sets the point $P_R$ at a position inside a vector locus of the stator current on the stator current vector plane.

7. The control system according to claim 5, wherein the stator resistance estimating unit estimates the stator resistance according to an equation $$R's=(k_{PRs}+s \cdot k_{IRs}) \cdot (i_s-P_R) \cdot (i'_s-P_R)$$

Wherein:
   R's—estimated value of the stator resistance;
   $i_s$—the measured value of the stator current;
   $i'_s$—the observed value;
   s—a Laplace operator;
   $k_{IRs}$ and $k_{PRs}$—gains.

8. A control system performing a vector control of an induction motor, comprising:
   a harmonic signal injecting unit injecting a harmonic signal in a flux current;

a second reference point setting unit setting a point $P_{Rr}$ at an arbitrary position on a stator current vector plane;

a second vector transforming unit transforming harmonic components, corresponding to the harmonic signal, of measured and observed values of a stator current of the induction motor into vectors starting from the point $P_{Rr}$ on the stator current vector plane;

a magnitude calculating unit obtaining a difference between magnitudes of the vectors transformed by said second vector transforming unit for the harmonic components of the measured and observed values; and a second rotor resistance estimating unit estimating a rotor resistance of the induction motor from the difference between magnitudes.

9. The control system according to claim 8, wherein said second reference point setting unit sets the point $P_{Rr}$ on a straight line obtained from current values corresponding to resistance values which are larger and smaller than a nominal rotor resistance value on the stator current vector plane.

10. The control system of according to claim 8, wherein the second rotor resistance estimating unit estimates the rotor resistance of the induction motor according to an equation $$R'r = (k_{PRr} + s \cdot k_{IRr}) \cdot (/i_d{}^* - P_{Rr}/ - /i'_d{}^* - P_{Rr}/)$$

Wherein
R'r—an estimated value of the rotor resistance;
$i_d{}^*$—the measured harmonic component of the stator current;
$i'_d{}^*$—the harmonic component of the observed value;
s—a Laplace operator;
$k_{IRr}$ and $k_{PRr}$—gains.

11. The control system according to claim 8, further comprising:

a first reference point setting unit setting a point $P_R$ at an arbitrary position on a stator current vector plane;

a first vector transforming unit transforming measured and observed values of a stator current of the induction motor into vectors starting from the point $P_R$ on the stator current vector plane;

a phase difference calculating unit obtaining a difference between phases of the vectors transformed by said first vector transforming unit for the measured and observed values; and a stator resistance estimating unit estimating a stator resistance of the induction motor from the difference between phases.

12. The control system according to claim 11, wherein said first reference point setting unit sets the point $P_R$ at a position inside a vector locus of the stator current on the stator current vector plane.

13. The control system according to claim 11, wherein the stator resistance estimating unit estimates the stator resistance according to an equation $$R's = (k_{PRs} + s \cdot k_{IRs}) \cdot (i_s - P_R) \cdot (i'_s - P_R)$$

Wherein:
R's—an estimated value of the stator resistance;
$i_s$—the measured value of the stator current;
$i'_s$—the observed value;
s—a Laplace operator;
$k_{IRs}$ and $k_{PRs}$—gains.

14. A control system performing a vector control of an induction motor using a speed sensor, comprising:

first reference point setting means for setting a point $P_R$ at an arbitrary position on a stator current vector plane;

first vector transforming means for transforming measured and observed values of a stator current of the induction motor into vectors starting from the point $P_R$ on the stator current vector plane;

magnitude calculating means for obtaining a difference between magnitudes of the vectors transformed by said first vector transforming unit for the measured and observed values;

phase difference calculating means for obtaining a difference between phases of the vectors transformed by said first vector transforming means for the measured and observed values;

first rotor resistance estimating means for estimating a rotor resistance of the induction motor from the difference between magnitudes; and stator resistance estimating means for estimating a stator resistance of the induction motor from the difference between phases.

15. A control system performing a vector control of an induction motor using no speed sensor, comprising:

first reference point setting means for setting a point $P_R$ at an arbitrary position on a stator current vector plane;

first vector transforming means for transforming measured and observed values of a stator current of the induction motor into vectors starting from the point $P_R$ on the stator current vector plane;

phase difference calculating means for obtaining a difference between phases of the vectors transformed by said first vector transforming means for the measured and the observed values; and stator resistance estimating means for estimating a stator resistance of the induction motor from the difference between phases.

16. A control system performing a vector control of an induction motor, comprising:

harmonic signal injecting means for injecting a harmonic signal in a flux current;

second reference point setting means for setting a point $P_{Rr}$ at an arbitrary position on a stator current vector plane;

second vector transforming means for transforming harmonic components, corresponding to the harmonic signal of a measured and observed values of a stator current of the induction motor into vectors starting from the point $P_{Rr}$ on the stator current vector plane;

magnitude calculating means for obtaining a difference between magnitudes of the vectors transformed by said second vector transforming means for harmonic components of the measured and observed values; and second rotor resistance estimating means for estimating a rotor resistance of the induction motor from the difference between magnitudes.

17. A parameter estimation method of an induction motor, comprising:

setting a point $P_R$ at an arbitrary position on a stator current vector plane;

transforming measured and observed values of a stator current of the induction motor into vectors starting from the point $P_R$ on the stator current vector plane;

obtaining a difference between phases of the vectors for the measured and the observed values; and estimating a rotor resistance of the induction motor from the difference between magnitudes.

18. The parameter estimation method according to claim 17, further comprising:

obtaining a difference between phases of the vectors for the measured and the observed values; and estimating a stator resistance of the induction motor from the difference between phases.

19. A parameter estimation method of an induction motor, comprising:

injecting a harmonic signal in a flux current;

setting a point $P_{Rr}$ at an arbitrary position on a stator current vector plane;

transforming harmonic components, corresponding to the harmonic signal, of measured and observed values of a stator current of the induction motor into vectors starting from the point $P_{Rr}$ on the stator current vector plane;

obtaining a difference between magnitudes of the transformed vectors for the harmonic components of the measured and observed values; and estimating a rotor resistance of the induction motor from the difference between magnitudes.

20. The parameter estimation method according to claim 19, further comprising:

setting a point $P_R$ at an arbitrary position on a stator current vector plane;

transforming unit transforming a measured and observed values of a stator current of the induction motor into vectors starting from the point $P_R$ on the stator current vector plane;

obtaining a difference between phases of the vectors for the transformed measured and observed values; and estimating a rotor resistance of the induction motor from the difference between phases.

* * * * *

UNITED STATES PATENT AND TRADEMARK OFFICE
CERTIFICATE OF CORRECTION

PATENT NO. : 6,281,659 B1 Page 1 of 1
DATED : August 28, 2001
INVENTOR(S) : Giuseppe It is certified that error appears in the above-identified patent and that said Letters Patent is hereby corrected as shown below:

<u>Column 12,</u>
Line 19, delete "current:" and insert -- current -- therefor.

Signed and Sealed this

Fourth Day of June, 2002

Attest:

JAMES E. ROGAN
Attesting Officer    Director of the United States Patent and Trademark Office